(12) United States Patent
Quest et al.

(10) Patent No.: US 7,601,003 B2
(45) Date of Patent: Oct. 13, 2009

(54) AQUATIC RESCUE TESTING DOLL

(75) Inventors: Johnny R. E. Quest, Ocoee, FL (US); Kristofer Jurski, Clermont, FL (US)

(73) Assignee: Jeff Ellis & Associates, Inc., Kingwood, TX (US)

( * ) Notice: Subject to any disclaimer, the term of this patent is extended or adjusted under 35 U.S.C. 154(b) by 344 days.

(21) Appl. No.: 11/740,503

(22) Filed: Apr. 26, 2007

(65) Prior Publication Data

US 2008/0268411 A1    Oct. 30, 2008

(51) Int. Cl.
*A63B 69/10* (2006.01)

(52) U.S. Cl. ..................................... 434/254; 434/256

(58) Field of Classification Search ................ 434/219, 434/226, 254, 256, 267; 441/1, 30, 80, 136; 446/153

See application file for complete search history.

(56) References Cited

U.S. PATENT DOCUMENTS

| | | | | |
|---|---|---|---|---|
| 4,536,165 | A * | 8/1985 | Maar | 446/153 |
| 5,722,871 | A * | 3/1998 | Zamir | 446/153 |
| 5,913,708 | A * | 6/1999 | Gross | 446/385 |
| 5,980,259 | A * | 11/1999 | Witmer | 434/254 |
| 6,581,677 | B2 * | 6/2003 | Dukes-Dobos et al. | 165/11.1 |
| 6,991,510 | B2 * | 1/2006 | Nan | 446/220 |
| 7,244,123 | B1 * | 7/2007 | Barron | 434/226 |
| 7,247,027 | B2 * | 7/2007 | Hoster, Jr. | 434/262 |
| 2007/0238376 | A1 * | 10/2007 | Gamble | 441/129 |

OTHER PUBLICATIONS

Simulaids, "Adult & Adolescent Water Rescue Manikins," dated Dec. 2005, 4-pgs.
Simulaids, "Adult & Adolescent CPR Water Rescue Manikins," dated Jan. 2006, 8-pgs.
Simulaids, "Rescue Baby & Child Instructions," dated Nov. 2005, 4-pgs.
Simulaids, "Rescue Manikins & Training Aids," obtained from URL://http:www.lifesaving.com, undated, 7-pgs.
Simulaids, "Water Rescue Manikins," obtained from URL://http:www.simulaids.com, copyrighted 2007, 3-pgs.
Water Safety Products, Inc., "Adult Water Rescue Manikin W/ CPR Capability," obtained from URL://http:www.watersafetyproducesinc.com, copyrighted 2007, 2-pgs.

(Continued)

*Primary Examiner*—Kurt Fernstrom
(74) *Attorney, Agent, or Firm*—Wong, Cabello, Lutsch, Rutherford & Brucculerri, LLP

(57) ABSTRACT

An aquatic doll is used to test and train rescue and life saving skills. The doll has a torso and has arms, legs, and a head all connected to the torso. The torso, arms, and legs are all substantially hollow and define a plurality of holes for filling the doll with water. A pair of feet are weighted and attached to the legs for breaking the surface of the water and causing the legs to sink initially when the doll is positioned on the water. Preferably, the head can be turned from side to side for a rescuer to simulate a water clearing technique during a rescue. In addition, the head can be tilted and has a moveable jaw for a rescuer to simulate a jaw thrust method in CPR. Finally, a spring and clicker mechanism is positioned in the hollow of the torso for simulating chest compression techniques of CPR.

26 Claims, 3 Drawing Sheets

OTHER PUBLICATIONS

Water Safety Products, Inc., "Adolescent Water Rescue Manikin," obtained from URL://http:www.watersafetyproducesinc.com, copyrighted 2007, 2-pgs.

Water Safety Products, Inc., "Adult Water Rescue Manikin," obtained from URL://http:www.watersafetyproducesinc.com, copyrighted 2007, 2-pgs.

Water Safety Products, Inc., "Child Vigilance Training Manikin 'Timmy'," obtained from URL://http:www.watersafetyproducesinc.com, copyrighted 2007, 2-pgs.

Water Safety Products, Inc., "Infant Water Rescue Manikin 'Billy'," obtained from URL://http:www.watersafetyproducesinc.com, copyrighted 2007, 2-pgs.

* cited by examiner

AQUATIC RESCUE TESTING DOLL

FIELD OF THE DISCLOSURE

The subject matter of the present disclosure relates to an aquatic doll for training and testing rescue and life saving skills of lifeguards and the like.

BACKGROUND OF THE DISCLOSURE

Manikins or portions of manikins are known in the art for teaching cardiopulmonary resuscitation (CPR) techniques and other rescue skills. Some manikins known in the art can weigh as much as 105 to 165-lbs. Some manikins known in the art can be placed in water for training and testing water rescue skills. For example, Simulaids, Inc. offers water rescue manikins constructed of plastic with a rust-resistant skeleton and articulating joints. This manikin may weight about 22-lbs. When placed in water, small holes in the legs and arms allow the manikin to fill with water and take on weight. A valve located at the shoulder of the manikin can be opened so that the torso can be filled with water. When filled, the manikin sinks to about its neck or mouth level in the water. A brick can be positioned in a hole defined in the abdomen of the manikin so it can be submerged in the water.

Even though the manikin may weigh only about 22-lbs, it may hold a significant amount of water weight once submerged in the water and even after being removed from the water. Such prior art water rescue manikins can be supplied with a lung, a mouthpiece, and an airway valve system so that rescuers can simulate breathing techniques on the manikin. However, such prior art water rescue manikins may not allow a rescuer to simulate a proper chest compression technique.

On way to test the rescue and lifesaving skills of lifeguards is to determine how long it takes them to identify a potential drowning victim at the bottom of a pool. Ideally, such a test is performed in a real world environment where any number of distractions may be present. Research indicates that the amount of time for lifeguards to identify a potential victim (i.e., a manikin) at the bottom of a pool needs improvement. Using existing manikins to test the detection skills of lifeguards is less than ideal because the existing manikins submerge slowly in the water-sometimes up to several minutes. Moreover, the additional weight required to submerge the exiting manikins makes them more cumbersome to set up and handle when testing rescue skills.

Accordingly, what is needed is an aquatic doll that quickly submerses in water and that can be used to test the detection, rescue, and lifesaving skills of rescuers in a real world environment. The subject matter of the present disclosure is directed to overcoming, or at least reducing the effects of, one or more of the problems set forth above.

DETAILED DESCRIPTION

A submersible aquatic doll can be used for testing and training the detection, rescue, and lifesaving skills of lifeguards or other rescue personnel. The doll has a torso and has a pair of arms, a pair of legs, and a head all connected to the torso. The torso, arms, and legs are all substantially hollow and define a plurality of holes for filling the doll with water. The head defines a plurality of holes in the top to allow captured air to escape as the doll sinks in water. A pair of feet are weighted and attached to the legs for breaking the surface of the water and causing the legs to sink initially when the doll is positioned on the water. When the doll is out of the water, the head preferably can be turned from side to side for a rescuer to simulate a water clearing technique during a rescue. In addition, the head can be tilted and has a moveable jaw for a rescuer to simulate a jaw thrust method in cardiopulmonary resuscitation (CPR) for opening an airway of a victim with a possible head or neck injury. Finally, a spring and clicker mechanism is positioned in the hollow of the torso for a rescuer to simulate chest compression techniques.

Figure 1:
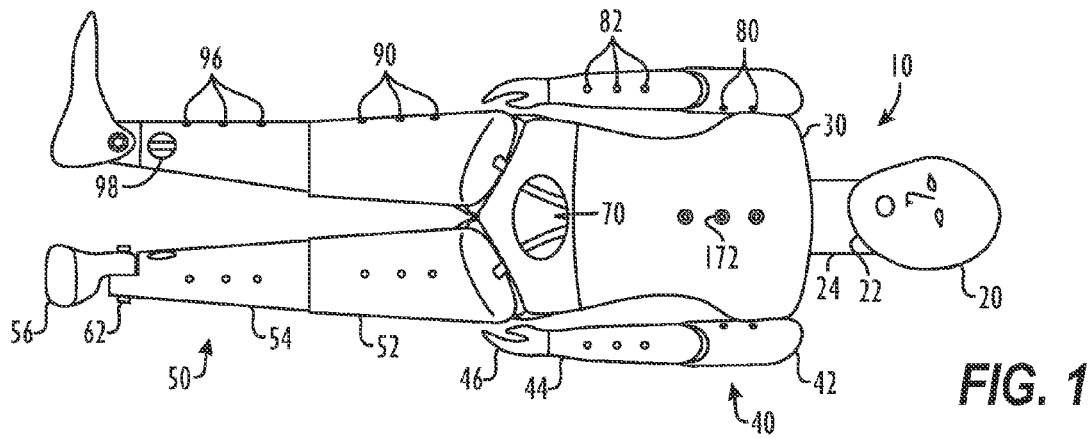
FIG. 1 illustrates a front view of an aquatic testing doll according to one embodiment of the present disclosure.
Figure 2:
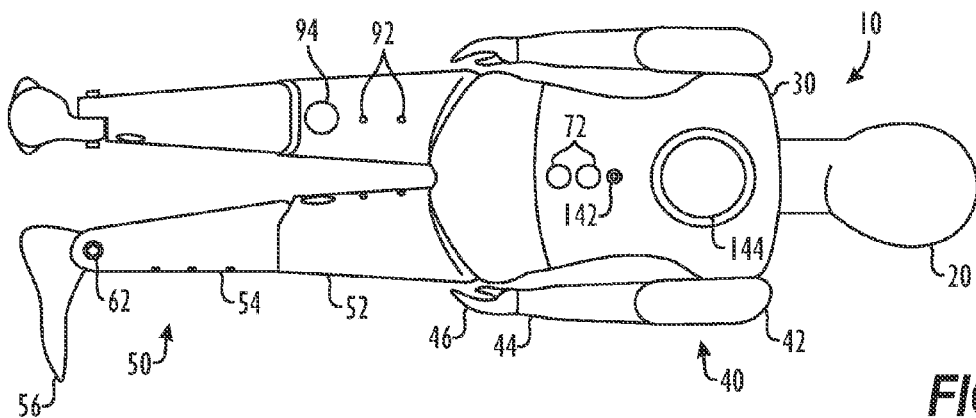
FIG. 2 illustrates a back view of the aquatic doll in FIG. 1.

FIGS. 1 and 2 illustrate front and back views of one embodiment of an aquatic testing doll 10 according to the present disclosure. The doll 10 includes an articulating head 20, a torso 20, articulating arms 40, and articulating legs 50. Each of the arms 40 has an upper arm portion 42, a lower arm portion 44, and a hand 46. Similarly, each of the legs 50 has an upper leg portion 52, a lower leg portion 54, and a foot 56. The torso 30, arms 40, and legs 50 of the doll 10 are molded from plastic, such as vinyl, and have a hollow construction.

Figure 3:
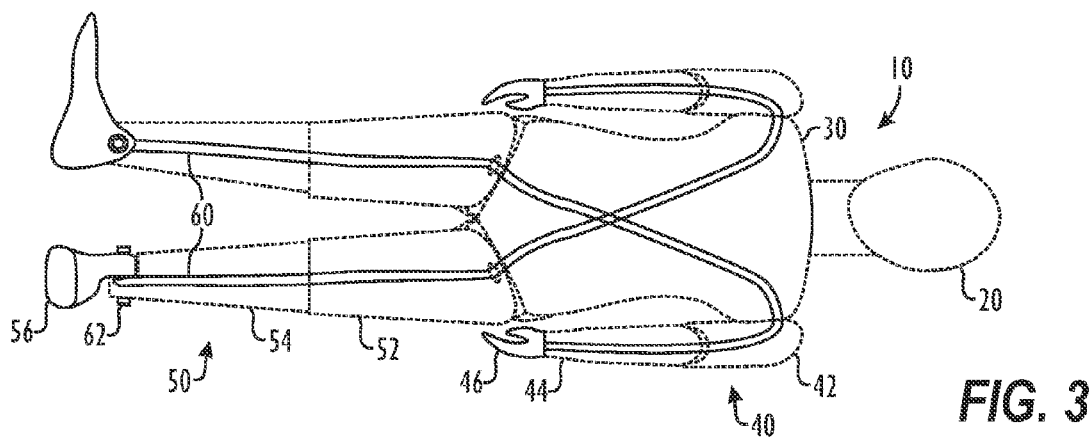
FIG. 3 illustrates how components of the legs and arms of the aquatic doll in FIG. 1 are connected to the torso.

As shown in FIG. 3, a pair of cables 60 are used to allow the arms 40 and legs 50 to articulate on the torso 30. The cables 60 are preferably made of stainless steel and positioned in plastic casing or tubing. As shown, each cable 60 has one end attached to a hand 46, and the cable 60 is run through an arm 40, torso 30, and opposing leg 50 where the other end is bolted to a foot 56 by a stainless steel bolt 62 or the like. Although shown in a crossed pattern, one cable 60 could connect the right leg 50 with right arm 40 and the other could connect the left leg 50 with the left arm 40.

Although the doll 10 is substantially hollow, it has a number of features that allow it to sink and be submersed quickly in water. For example, the feet 56 are preferably filled with weight, such as lead or other material, to facilitate sinking of the doll 10 as discussed later. In one embodiment, each foot 56 may be weighted to weigh between about 2 to 3 lbs. (e.g., 2 lbs. and 10 oz. in one particular implementation) for a child-size embodiment of the doll 10 that has an overall weight of about 31 lbs. It will be appreciated that the weight of the feet and the doll may vary depending on its overall intended size, its manufacturing process, etc.

Figure 4:
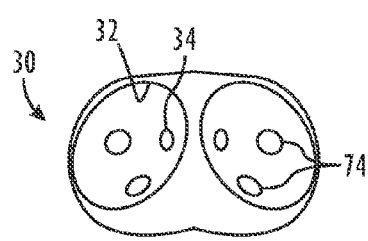
FIG. 4 illustrates a bottom view of the torso of the aquatic doll in FIG. 1.

In addition to being hollow and having weighted feet, various water holes or openings are strategically defined at different locations in the hollow components to allow the doll 10 to both fill and drain relatively quickly during a testing situation. In particular, the front side of the torso 30 defines an enlarged opening 70 at the waist that communicates with the inner hollow of the torso 30, while the back side defines additional oversized holes 72. The enlarged opening 70 in the front may not be strictly necessary for enabling the doll 10 to sink as intended, although it may facilitate the process. The bottom end of the torso 30 as shown in FIG. 4 has leg wells 32 that each have oversized holes 74 for filling and draining the hollow torso 30 with water in addition to holes 34 for each cable (60; FIG. 3) used to connects the legs (not shown). In addition, the leg wells 32 have.

Figure 5:
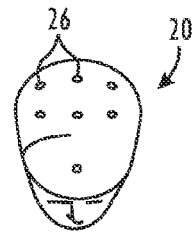
FIG. 5 illustrates a top view of the head of the aquatic doll in FIG. 1.

As for each arm 40, the upper arm portion 42 define a plurality of smaller holes 80 (e.g., at least two on the inner side), and the lower arm portion 44 defines a plurality of smaller holes 82 (e.g., at least three on an outer side). As for each leg 50, the front of the upper leg portion 52 defines a plurality of smaller holes 90 (e.g., at least three). The back of the upper portion 52 defines a plurality of smaller holes 92 (i.e., two in FIG. 3) and defines an oversized hole 94 near the connection of the lower leg portion 54. Similarly, the lower leg portion 54 defines a plurality of smaller holes 96 (e.g., at least three along the shin) and defines an oversized hole 96 at the inside of the ankle. The smaller holes 90, 92, and 96 on the legs 50 may not be strictly necessary for the doll 10 to sink as intended, although they may facilitate the process by allow water to enter and trapped air to escape. As shown in FIG. 5, the head 20 defines a plurality of smaller holes 26 as well, at least six at the top and at least one on the forehead. These holes 26 allow trapped air to escape from the head 20 as the doll 10 sinks and fills with water as discussed below.

For the sake of comparison, the smaller holes (e.g., 26, 80, 82, 90, 92, 96) can be made with a drill bit after molding of the components and can have a diameter of about 7/32 to 1/4-inch, for example. The larger holes (e.g., 70, 72, 74, 94, 98) can be cut out from the molded components or formed during the molding processes. Preferably, the oversized holes (e.g., 72, 74, 94, 98) are about 1-inch in diameter, for example.

The holes depicted in the various components are for both filling and draining the doll 10 during use. The oversized holes 72, 74, 94, 98 depicted are generally suited for quick filling and draining and are typically positioned at the lower ends and/or back of the components as shown. For example, the upper leg portion 52 has its oversized hole 94 positioned at the back of the doll's knee where it connects to the lower leg portion 54. Similarly, the lower leg portion 54 defines its oversized hole 98 at the doll's ankle where it connects to the feet 56. Thus, these oversized holes 94 and 98 generally allow for unobstructed inflow of water, while upper holes, such as smaller holes 90, 92, 96 in the legs 50, may allow for quick release of captured air. Likewise, the torso 30 has the oversized holes 74 at its bottom end where the legs 50 connect to allow for quick filling and draining of water, and the torso 30 also has the oversized holes 72 on the back for the same purposes.

As noted in the Background Section of the present disclosure, a typical prior art manikin introduced into the water may lay on the surface for a time and may eventually sink after several minutes. Moreover, weight must be added to the prior art manikin to submerge it in water, but the added weight can make the manikin unmanageable in a rescue simulation. Thus, the ability of the disclosed doll 10 to sink substantially quickly in water and preferably within 10 seconds or less makes the disclosed aquatic doll 10 suited for real-life testing and simulation.

Figure 6A:
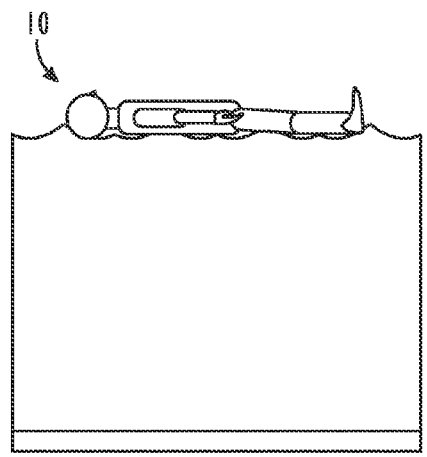
FIGS. 6A-6D illustrate examples stages of the aquatic doll sinking in water.
Figure 6B:
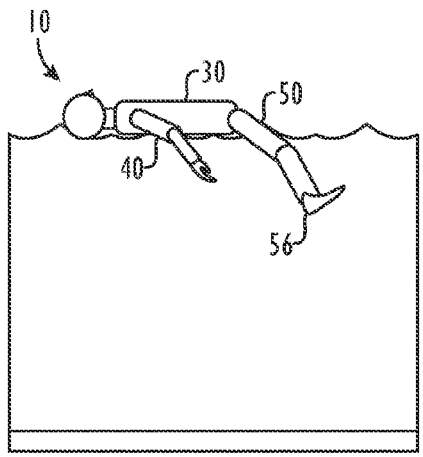

How the doll 10 sinks in water is depicted in FIGS. 6A-6D. In FIG. 6A, the testing doll 10 is shown after being introduced (e.g., placed or thrown) into the water. Because it is substantially hollow, the doll 10 may float only momentarily unless induced to sink. In FIG. 6B, the weighted feet 56 immediately break the surface of the water and begin to sink, pulling the legs 50 under the surface. The ankle holes 98 and the behind-the-knee holes 94 in the legs 50 allow water to enter the leg components 52 and 54, while the smaller holes 90, 92, 96 can allow air to escape from the hollows of the leg components 52 and 54. A similar action can occur with the arms 40 as the hands begin to sink, although the arms 40 may alternatively be made more buyout so as to float longer if desired.

Figure 6C:
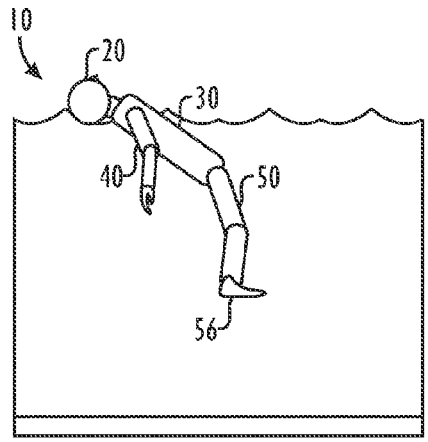

With the legs 50 filled, the weight of displacement starts to pull down the torso 30 under the surface. Water fills the torso 30's main hollow entering via holes 72 in the back and holes 74 in the bottom end. In FIG. 6C, the legs 50 and a majority of the torso 30 are fully submersed after about 3-4 seconds of the doll 10 being in the water. Captured air enters the head 20 and is allowed to escape through the plurality of holes 26 defined at the top of the head 20 (See FIG. 5).

Figure 6D:
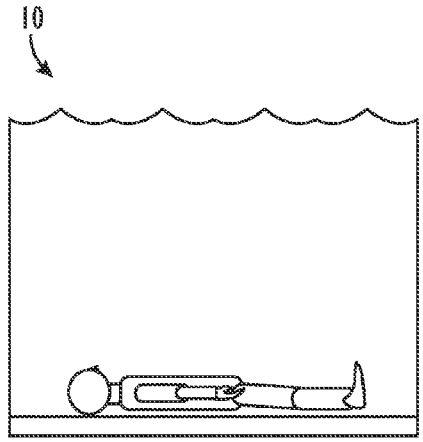

As shown in FIGS. 6A-6C, the doll 10 undergoes a tipping action after being introduced into the water that allows water to quickly fill the legs 50 and then up the torso 30 and allows air to escape from the head 20. Thus, the tipping action of the doll 10 simulates the actions of a person in the water because the doll 10 immediately stands in the water as the water begins to fill the legs 50 and torso 30 and push the captured air to the head 20 where it can escape through the smaller air holes 26 in the top of the head 20. Once most of the doll 10 has filled with water, the weighted feet 56 continue to pull the water-filled doll 10 to the bottom. Eventually, the entire doll 10 is submersed and lies at the bottom of a pool as shown in FIG. 6D. In general, the doll 10 is intended to sink to the bottom of a standard pool within 10 seconds or less.

When testing rescue skills, it is preferable that the testing be done at random when a lifeguard is not aware of being tested. For example, while a lifeguard is normally watching a busy pool, a supervisor may secretively place the doll 10 in the pool. Although this may require some degree of ingenuity by the supervisor, the ability of the doll 10 to sink quickly and without added weight makes the doll 10 more manageable for the testing. This procedure can then be used to test a lifeguards vigilance and ability to detect when a person (i.e., the doll 10) may have drowned and sunk to the bottom of the pool.

When the lifeguard dives into retrieve the submerged doll 10, the water-filled doll 10 is intended to simulate the body weight of a rescue victim during a rescue scenario in the water. For example, when the lifeguard acts to pull the doll 10 from the bottom of the pool to simulate a rescue, the volume of water substantially trapped in the doll 10 simulates the weight of a live rescue victim. Once the lifeguard has brought the doll 10 to the side of the pool, the various holes in the doll 10 allow the water to drain relatively quickly so it will not be so unwieldy and heavy when being removed from the pool. Moreover, the doll 10 could become damaged if it were allowed to retain a great deal of water for an extended period of time out of the water.

Once out of the water, the testing doll 10 can also be used to test additional life saving skills. Notably, the additional features of the doll 10 for testing skills allow a rescuer to go from a water environment to a land-based environment without having to use different manikins. As noted previously, the head 20 can articulate on the torso 30 by turning from side to side so the rescuer can simulate a water clearing technique with the head 20. In addition, the jaw 22 and head 20 also articulate so that the rescuer can simulate the Jaw Thrust Method in CPR. The chest of the doll 10 also compresses so the rescuer can simulate chest compression techniques. To achieve these additional testing features, the doll 10 includes internal components that are depicted in FIGS. 7 and 8.

Figure 7:
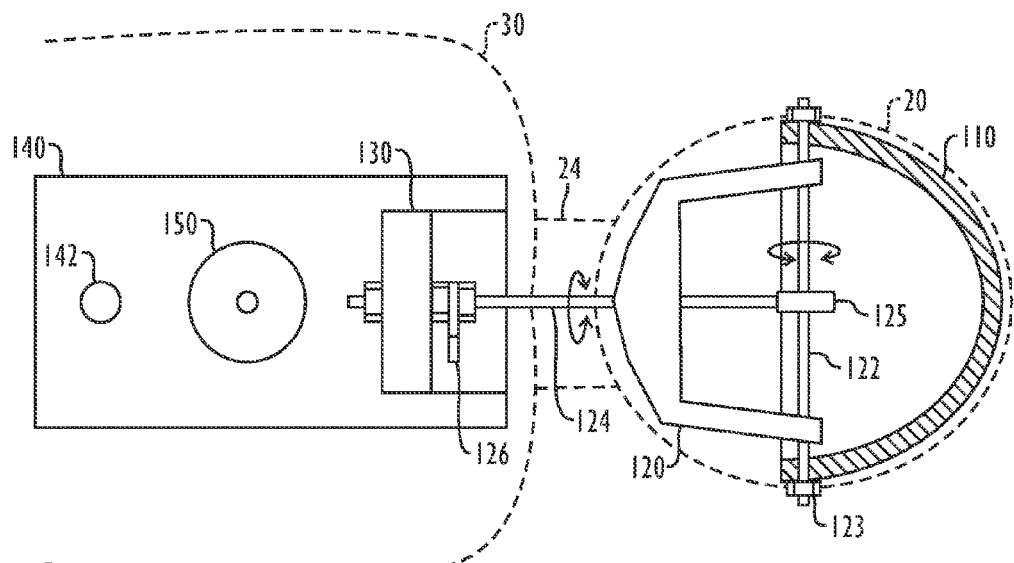
FIG. 7 illustrates a front view of some internal components of the disclosed aquatic doll.
Figure 8:
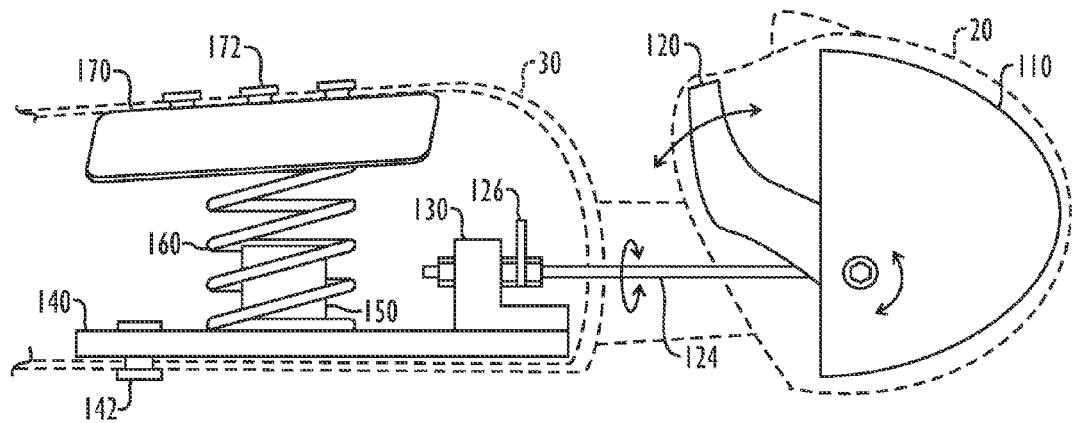
FIG. 8 illustrates a side view of some of the internal components of the disclosed aquatic doll.

In FIGS. 7 and 8, vinyl skin has been removed so that a hard skull cap 110 and a jaw 120 of the head 20 are visible. The jaw 120 articulates on a cross bar 122 connected to the skullcap 110 by fasteners 123. In addition, the cross bar 122 is positioned in an eye bolt end 125 of a neck shaft 124. In this way, the skull cap 110 can articulate in the eye bolt end 125 so the head 20 can be tilted relative to the torso 30.

In the torso 30's hollow, a base plate 140 is attached to an inside surface of the torso 30 by a fastener or rivet 142, and a bracket member 130 is attached to the base plate 140. To allow the head 20 to turn, the end of the neck shaft 122 is rotatably connected by bolts and washers to the bracket member 130, and a limiter 126 limits the rotation of the neck shaft 122 when the head 20 is turned.

As shown in the side view of FIG. 8, a compression plate 170 fits in the hollow of the torso 30 against the front inner surface and can be attached to the torso 30 by fasteners or rivets 172. A spring 160 is held between the compression plate 170 and the base plate 140, and a clicker 150 is attached to the base plate 140 inside the spring 160. In simulating chest compressions during rescue training, a rescuer pushes on the chest area of the torso 30 and forces the compression plate 170 against the bias of the spring 160. The clicker 150 identifies proper chest compression techniques by giving an audible "click" when the rescuer has properly administers a chest compression that causes the compression plate 150 to activate the clicker 150. (To prevent potential damage to the back of the doll 10, a reinforced area 144 may be provided on the back of the torso 30 as shown in FIG. 2). The clicker 150 in the torso 30 allows the rescuer to consistently determine the needed depth of compression during CPR—a feature not available in existing rescue manikins.

Although the doll 10 has a moveable jaw 120 and may have an open mouth in the vinyl skin, the doll 10 may be used to simulate rescue breathing techniques by allowing a rescuer to place a breathing mask on the mouth and only announce the breathing actions. This may be done because dolls capable of being used for training live rescue breathing must account for the various sanitary issues involved.

Because the disclosed doll 10 is intended to be used in water, the construction is intended to allow for substantially unobstructed water flow in the hollows of the doll and is preferably made with materials that can handle the corrosive environments of pool water. For example, the cross bar 122, neck shaft 124, spring 160, various fasteners, and other metal components are preferably made of stainless steel or other non-corrosive metals. The skullcap 110, jaw 120, bracket member 130, back plate 140, and compression plate 170, and other components are preferably made of vinyl or other plastic materials.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A submersible aquatic testing doll, comprising:
   a torso being substantially hollow and defining at least one first hole for filling the torso with water;
   a pair of arms moveably connected to the torso, each of the arms being substantially hollow and defining at least one second hole for filling the arm with water;
   a pair of legs moveably connected to the bottom end of the torso, each of the legs being substantially hollow and defining at least one third hole for filling the leg with water; and
   a head connected to the torso, the head being substantially hollow and defining at least one fourth hole at a top of the head for escaping of air as the head fills with water.

2. The doll of claim 1, wherein the at least one first hole comprises a plurality of substantially large holes defined in a back side of the torso.

3. The doll of claim 1, wherein the at least one first hole comprises a plurality of substantially large holes defined in a bottom end of the torso.

4. The doll of claim 1, wherein each arm comprises an upper portion and a lower portion.

5. The doll of claim 4, wherein the at least one second hole in each arm comprises a plurality of holes in the upper portion and a plurality of holes in the lower portion.

6. The doll of claim 1, wherein each leg comprises an upper portion, a lower portion, and a foot.

7. The doll of claim 6, wherein each foot is weighted.

8. The doll of claim 7, wherein the at least one third hole in each leg comprises a substantially large hole positioned at a lower back end of the upper portion where it connects to the lower portion.

9. The doll of claim 7, wherein the at least one third hole comprises a substantially large hole positioned at a lower end of the lower portion where it connects to the foot.

10. The doll of claim 1, wherein a pair of cable connect the legs and the arms to the torso and allow the legs and arms to articulate.

11. The doll of claim 1, further comprising a spring and clicker mechanism positioned in the hollow of the torso.

12. The doll of claim 11, wherein the spring and clicker mechanism comprises:
    a back plate attached to a back inside surface of the hollow;
    a front plate positioned adjacent a front inside surface of the hollow;
    a spring positioned between the front plate and the back plate; and
    a clicker positioned between the front plate and the back plate and activated by movement of the front plate.

13. The doll of claim 1, wherein the head is moveably connected to the torso and comprises a moveable jaw.

14. A submersible aquatic testing doll, comprising:
    a torso being substantially hollow and having a front side, a back side, a top end and a bottom end, the back side defining at least one first torso hole for filling the torso with water, the bottom end defining at least one second torso hole for filling the torso with water;
    a pair of arms connected to the torso, each of the arms being substantially hollow and defining at least one arm hole for filling the arm with water;
    a pair of legs connected to the bottom end of the torso, each of the legs being substantially hollow and defining at least one leg hole for filling the leg with water;
    a pair of feet, each foot being weighted and attached to an end of one of the legs; and
    a head connected to the top end of the torso, the head being substantially hollow and defining a plurality of head holes at a top of the head for escaping of air.

15. The doll of claim 14, wherein the at least one first torso hole comprises a plurality of substantially large holes defined in the back side of the torso.

16. The doll of claim 14, wherein the at least one second torso hole comprises a plurality of substantially large holes defined in leg wells in the bottom end of the torso.

17. The doll of claim 14, wherein each arm comprises an upper tubular portion and a lower tubular portion.

18. The doll of claim 17, wherein the arm holes in each arm comprise a plurality of holes in the upper tubular portion and a plurality of holes in the lower tubular portion of the arm.

19. The doll of claim 14, wherein each leg comprises an upper tubular portion and a lower tubular portion.

20. The doll of claim 19, wherein the leg holes in each leg comprises a substantially large hole positioned at a lower back end of the upper tubular portion where it connects to the lower tubular portion.

21. The doll of claim 19, wherein the leg holes in each leg comprises a substantially large hole positioned at a lower end of the lower tubular portion where it connects to the foot.

22. The doll of claim 14, wherein a pair of cable connect the legs and the arms to the torso and allow the legs and arms to articulate.

23. The doll of claim 14, further comprising a spring and clicker mechanism positioned in the hollow of the torso.

24. The doll of claim 23, wherein the spring and clicker mechanism comprises:
- a back plate attached to a back inside surface of the hollow;
- a front plate positioned adjacent a front inside surface of the hollow;
- a spring positioned between the front plate and the back plate; and
- a clicker positioned between the front plate and activated by movement of the front plate.

25. The doll of claim 14, wherein the head is moveably connected to the torso and comprises a moveable jaw.

26. A submersible aquatic testing doll, comprising:
- a torso being substantially hollow and having a front side, a back side, a top end and a bottom end, the torso at least one torso hole for filling the torso with water;
- a spring and clicker mechanism positioned in the hollow of the torso;
- a pair of arms moveably connected to the torso, each of the arms being substantially hollow and defining at least one am hole for filling the arm with water;
- a pair of legs moveably connected to the bottom end of the torso, each of the legs being substantially hollow and defining at least one leg hole for filling the leg with water;
- a pair of feet, each foot being weighted and attached to an end of one of the legs; and
- a head moveably connected to the top end of the torso and having a moveable jaw, the head being substantially hollow and defining a plurality of head holes at a top of the head for escaping of air as the head fills with water.

* * * * *